(12) United States Patent
Stevens

(10) Patent No.: US 6,505,790 B2
(45) Date of Patent: *Jan. 14, 2003

(54) PRETENSIONER DEVICE

(75) Inventor: Bruce A. Stevens, Oakland Township, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/874,494

(22) Filed: Jun. 5, 2001

(65) Prior Publication Data

US 2002/0074441 A1 Jun. 20, 2002

Related U.S. Application Data

(63) Continuation-in-part of application No. 09/777,388, filed on Feb. 5, 2001, now Pat. No. 6,419,177.
(60) Provisional application No. 60/209,376, filed on Jun. 5, 2000.

(51) Int. Cl.$^7$ .............................................. B60R 22/46
(52) U.S. Cl. ..................................................... 242/374
(58) Field of Search ......................... 242/374; 280/806; 297/478, 480

(56) References Cited

U.S. PATENT DOCUMENTS

| | | | |
|---|---|---|---|
| 4,750,759 A | 6/1988 | Escaravage | 280/806 |
| 4,932,603 A | 6/1990 | Yamanoi et al. | |
| 5,222,994 A | 6/1993 | Hamaue | |
| 5,397,075 A | 3/1995 | Behr | 242/374 |
| 5,451,008 A | 9/1995 | Hamaue | 242/374 |
| 5,553,803 A | 9/1996 | Mitzkus et al. | 242/374 |
| 5,588,608 A | 12/1996 | Imai et al. | 242/374 |
| 5,641,131 A | 6/1997 | Schmid et al. | 242/374 |
| 5,667,161 A | 9/1997 | Mitzkus et al. | 242/374 |
| 5,697,571 A | 12/1997 | Dybro et al. | 242/374 |
| 5,743,480 A | 4/1998 | Kopetzky et al. | 242/374 |
| 5,839,686 A | 11/1998 | Dybro et al. | 242/374 |
| 5,853,135 A | 12/1998 | Dybro et al. | 242/374 |
| 5,899,399 A | 5/1999 | Brown et al. | 242/374 |
| 5,906,328 A | 5/1999 | Hamaue et al. | 242/374 |
| 5,944,350 A | 8/1999 | Grabowski et al. | 280/806 |
| 5,967,440 A | 10/1999 | Marshall | 242/374 |
| 6,000,655 A | 12/1999 | Coppo | 242/374 |
| 6,036,274 A | 3/2000 | Kohlndorfer et al. | 297/480 |
| 6,139,058 A | 10/2000 | Bohmler | 280/806 |

FOREIGN PATENT DOCUMENTS

| | | | |
|---|---|---|---|
| DE | 32 31 509 A1 | 3/1994 | |
| DE | 100 10 379 A1 | 9/2000 | B60R/22/46 |

*Primary Examiner*—John M. Jillions
(74) *Attorney, Agent, or Firm*—Dinnin & Dunn P.C.

(57) ABSTRACT

A pretensioner 10 for a seat belt 12 employs a strap 30 fixed about a pulley 34 and also fixed at an opposite end 36 to a housing 18. Upon pretensioner activation, an actuator 20 is propelled across a rectangular passage 72 thereby impelling a portion 31 of the strap 30 extending across the passage 72. Torque created by the strap 30 about the pulley 34 effects rotary advancement of the geared pulley 34 with a geared clutch 37 engaged therewith. The geared clutch 37 co-axially and rotatably communicates with a seat belt retractor spool 46 wherein a seat belt retractor spool shaft 40 axially extends through the clutch 37 and spool 46. Activation of the pretensioner 10 therefore results in ignition of a gas generant 16 that produces sufficient gas pressure to drive the actuator 20 through a linear passage 72, thereby effecting rotary movement of the pulley 34, the clutch 37, the shaft 40, and the spool 46. A seat belt 12 wound about the spool 46 is thereby pretensioned.

8 Claims, 3 Drawing Sheets

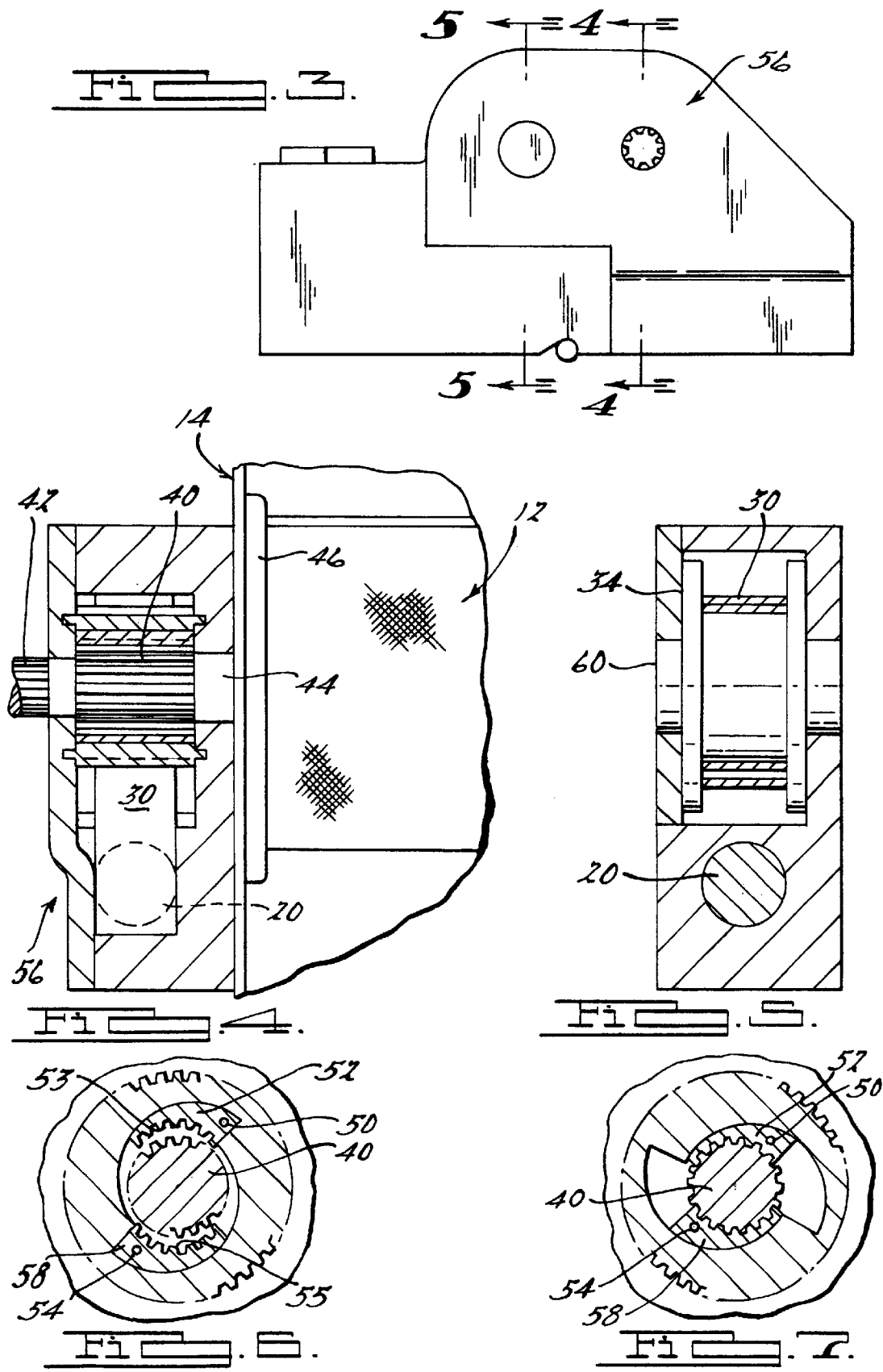

PRETENSIONER DEVICE

CROSS-REFERENCE TO RELATED APPLICATIONS

This application claims the benefit of U.S. Provisional Application Serial No. 60/209,376 filed on Jun. 5, 2000. This application is also a continuation-in-part of U.S. application Ser. No. 09/777,388 filed on Feb. 5, 2001 now U.S. Pat. No. 6,419,177.

BACKGROUND OF THE INVENTION

The present invention relates to seat belt pretensioners and, more specifically, to a seat belt pretensioner that incorporates a plurality of simplified motion multipliers thereby reducing the actuator stroke requirement.

Seat belt pretensioners remove slack from a seat belt in the event of a collision in order to minimize forward movement of the passenger. While it is known to use pyrotechnic gas generators to operate mechanisms which wind up or otherwise pull in slack of the seat belt during a collision, such known pyrotechnic gas generators are generally disposed internally of a seat belt retractor. Thus, the vehicle owner is faced with a significant cost penalty in that the entire pretensioner and retractor assembly must be replaced after activation because of the inability to prevent degradation of the retractor. High-temperature gases tend to abrade interior metal surfaces and produce ash and clinkers that bind up the retraction mechanism.

Another problem with known pretensioners is that they are designed to activate only in severe accidents, for example, accidents that exhibit "G" forces sufficient to activate the vehicle airbags. Safety system designers generally choose such a relatively high activation threshold due to the expense of replacing the entire seat belt retractor and pretensioner assembly after activation. As a result, seat belt pretensioners do not protect passengers in less severe accidents.

A related problem with known pretensioners is that when the pretensioner is activated only in severe accidents, activation is relatively late in the crash sequence. Thus, the pretensioner must rapidly take up slack in the seat belt, sometimes injuring the passenger.

U.S. Pat. No. 5,967,440, herein incorporated by reference, describes a pretensioner and a conventional retractor for a safety belt system. When compared to the seatbelt retractor, the pretensioner is relatively complex and large, thus increasing the weight and spatial requirements of the seatbelt assembly.

U.S. Pat. No. 5,899,399, herein incorporated by reference, describes a state of the art pretensioner. The pretensioner is relatively complex and as such complicates the manufacturing process.

U.S. Pat. No. 5,944,350, herein incorporated by reference, describes a state of the art pretensioner. Again, the pretensioner is relatively large, thus increasing the weight and spatial requirements of the seatbelt assembly.

German Pat. No. DE 10010379 A1, herein incorporated by reference, describes a pretensioner having an arcuate path for a multi-piece actuator (a plurality of cylinders) that drives a steel cord wrapped around a webbing reel hub and thereby effects pretensioning of an associated seat belt. The manufacturing of the pretensioner is more complex given the multi-piece actuator and given the arcuate channel that the actuator must traverse. Uniformity in channel width and effective sealing becomes more difficult with the use of an arcuate channel. Secondly, a noise reduction means is employed to prevent rattling during normal vehicle operation, thereby increasing manufacturing costs. Furthermore, the joint use of the multi-piece actuator with the steel cord results in a friction loss and a reduction in the load applied to the steel cord by the forward-most cylinder of the actuator. As a result, more force is required to drive the multi-piece actuator and pretension the seatbelt. One solution is described by the use of an intermediate element "43" for facilitating the smooth movement of the rotating elements along the arcuate channel. Consequently, without the use of the intermediate element "43", a more robust pretensioner housing would be necessitated to withstand the relatively greater combustion pressure (produced by a greater amount of propellant) likely necessary to pretension the seatbelt in accordance with customer requirements.

Other pretensioner designs employ relatively complicated clutch assemblies for clutching a seat belt retractor axle associated therewith. Many known pretensioner drive systems are also relatively complex. U.S. Pat. Nos. 6,042,041, 5,842,344, 5,794,876, and 5,699,976, herein incorporated by reference, illustrate the complexity of known pretensioners. Simplification of known designs, therefore, is desirable given a resultant simplification of manufacturing requirements.

SUMMARY OF THE INVENTION

The aforesaid problems are solved, in accordance with a preferred constructed embodiment of the present invention, by a seat belt pretensioner that utilizes a plurality of motion multipliers within an essentially sealed housing thereby preventing retractor exposure to combustion gases and clinkers. More specifically, the present invention utilizes a drive gear that is meshed or engaged with a geared clutch sleeve. A pair of clutch segments is fixed radially inward of the clutch sleeve and radially outward of a webbing reel shaft of a seat belt retractor for gripping the shaft upon pretensioner activation. The webbing reel shaft axially extends through the circumferentially opposed clutch segments and rotates freely during normal operation of the vehicle. The webbing reel shaft also extends through the house and axially through a webbing reel of the seat belt retractor thereby establishing coaxial communication between the activated clutch and the webbing reel. Inclusion of the clutch (clutch sleeve and clutch segments) within the pretensioner eliminates the need for a clutch operable within the retractor. The present design also prevents occupant exposure to the gases and solids formed upon combustion of a pyrotechnic composition contained within the pretensioner.

In a preferred embodiment of the invention, the pretensioner contains a housing, a geared pulley or drive gear engaged with a geared clutch sleeve, a retractor shaft axially and longitudinally disposed within the geared clutch, a strap that rotates the drive gear upon pretensioner activation, a piston that tensions and impels the strap upon pretensioner activation, a gas generant or pyrotechnic that propels the piston, and an initiator that ignites the gas generant upon a signal from an accelerometer, for example. Upon ignition of the gas producing pyrotechnic, the piston is driven forward in an essentially linear path thereby tightening the strap and rotating the drive gear, and simultaneously rotating the geared clutch to facilitate a torque about the webbing reel shaft. Rotation of the geared clutch sleeve fixed over a first end of the webbing reel shaft thus effects pretensioning of a seat belt spooled about the webbing reel.

After use, only the pretensioner or parts therein need be replaced, obviating the expense of also replacing the retractor or other components of the seat belt retraction mechanism. In general, the retractor is preserved for future use.

Because expense heretofore associated with activation of a pretensioner is significantly reduced, passengers can be given the protection of seat belt pretensioning in even minor accidents. Moreover, a pretensioner that activates in minor collisions will also activate earlier in a severe crash sequence. Earlier activation of the pretensioner permits the pretensioner to operate less aggressively, reducing the possibility of injury caused by the seat belt pretensioner itself.

BRIEF DESCRIPTION OF THE DRAWINGS

FIG. 3 is an elevational view of an embodiment containing a cover.

FIG. 4 is a cross-sectional view of the embodiment in FIG. 3 taken along the line A—A, and illustrates the mechanical cooperation between a pretensioner clutch of the present invention and a state-of-the-art seat belt retractor.

FIG. 5 is a cross-sectional view of the embodiment in FIG. 3 taken along the line B—B, and illustrates the mechanical cooperation between the strap and the geared pulley of a pretensioner of the present invention.

FIG. 6 is a plan view of the clutch assembly spaced radially outwardly of the retractor shaft prior to pretensioner activation.

FIG. 7 is a plan view of the clutch assembly compressed radially inwardly about the retractor shaft upon pretensioner activation.

DESCRIPTION OF THE PREFERRED EMBODIMENT

Referring to the figures, a pretensioner 10 in accordance with a preferred embodiment of the invention, comprises a gas generating composition 16 employed to pretension a seat belt 12 of a conventional seat belt retractor 14. Typical seat belt retractors, to which the pretensioner of the present invention has application, are taught in U.S. Pat. Nos. 5,743,480, 5,553,803, 5,667,161, 5,451,008, 4,558,832 and 4,597,546, herein incorporated by reference. It should be emphasized, however, that although many known retractors employ clutch mechanisms upon pretensioner activation, the present invention obviates the need for clutch assemblies within the retractor used to pretension the seat belt. Pretensioners of the present invention contain a clutch assembly to improve and simplify the pretensioner drive as compared to other known pretensioners. Manufacturing of retractors associated with a pretensioner of the present invention may therefore be simplified.

Figure 1:
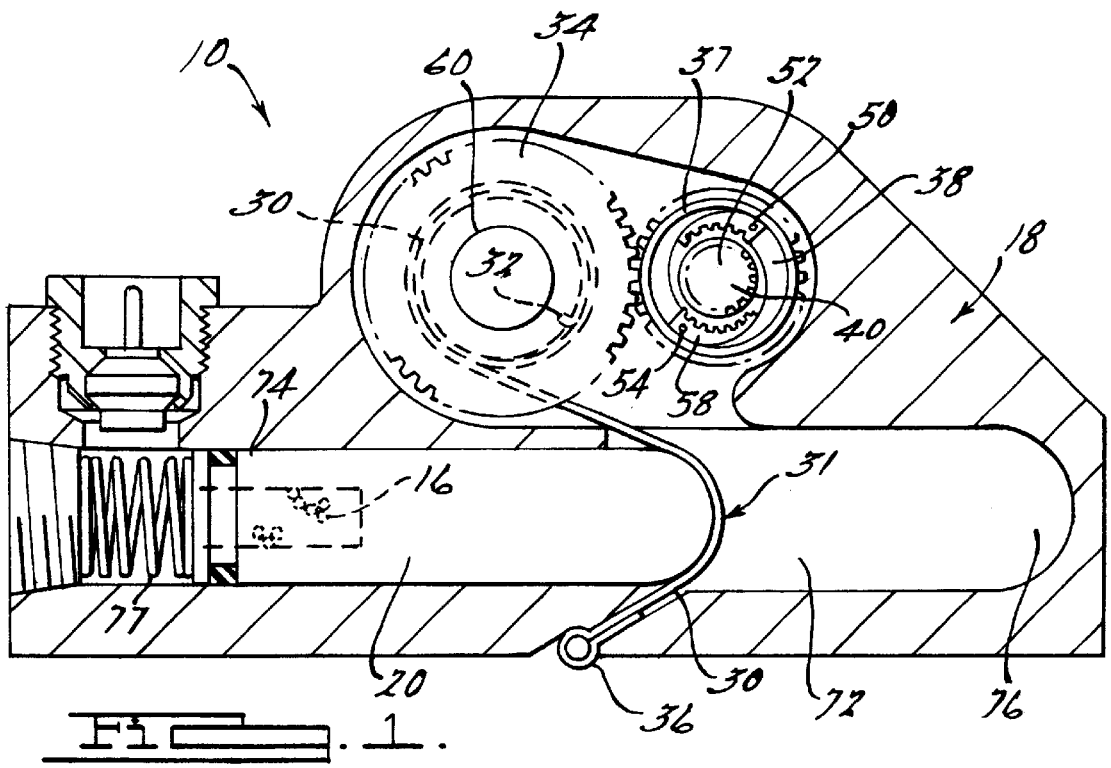
FIG. 1 is a diagrammatic elevational view of a replaceable seat belt pretensioner prior to activation, in accordance with the present invention.
Figure 2:
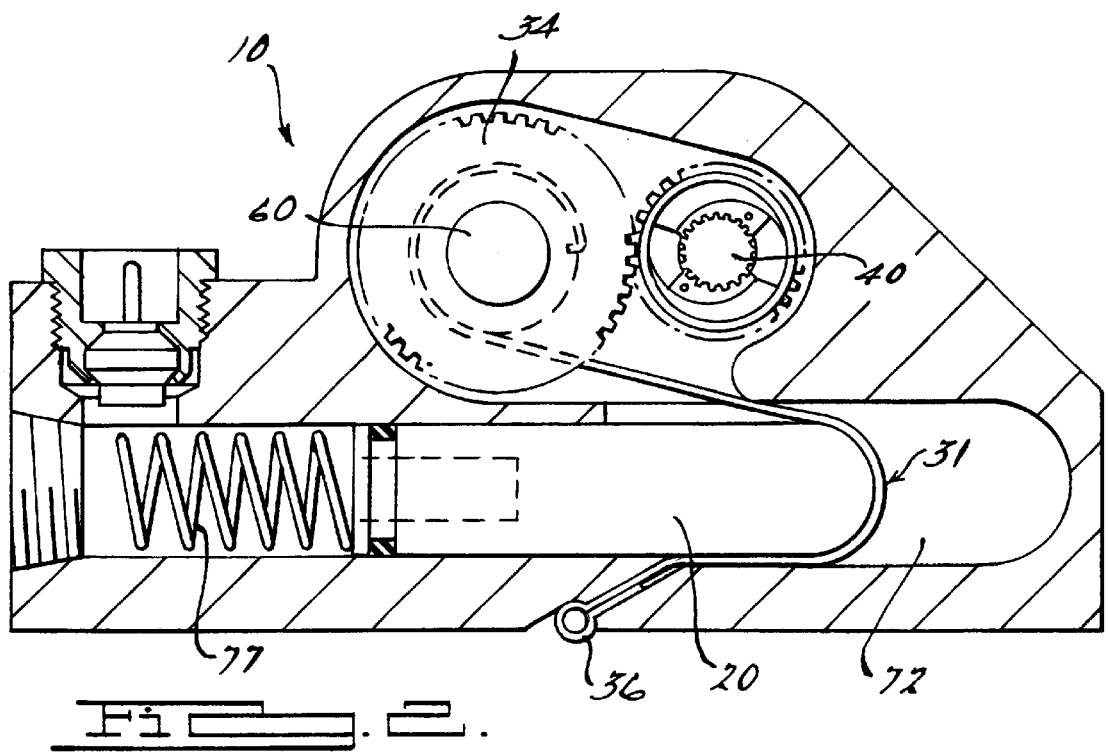
FIG. 2 is a diagrammatic elevational view of the replaceable seat belt pretensioner after activation, in accordance with the present invention.

Housing 18 contains the gas generant 16. Upon combustion, the gas generant 16 drives a piston 20. The piston 20 is made from steel, brass, aluminum, plastic, or other sufficiently rigid material. If desired, a gas generator 22 may be contained within the housing 18 and employ the pyrotechnic material 16 for generating gas upon ignition thereof. The gas generant composition 16 may be any known pretensioner gas generant compound or alternatively, it may be any known gas generant useful in airbags, for example. To illustrate, see U.S. Pat. No. 5,035,757 herein incorporated by reference. Additionally, as shown in FIG. 1, the gas generant 16 may be contained within the piston 20 thereby eliminating the need for a separate generator 22.

Electrical contacts 24 on an initiator 26 communicate with a crash event sensor (not shown) that signals actuation of the pretensioner 10 upon a vehicle collision. Once the initiator 26 receives a signal, from an accelerometer for example, it ignites the pyrotechnic gas generant 16. An initiator retainer 28 is threadedly or otherwise received within the housing 18 and houses the initiator 26. Stated another way, a means for activating the pretensioner 10 and driving the actuator 20 upon a crash event includes the gas generant 16 contained within the piston 20 (or provided in a separate gas generator 22), the electrical contacts 24, and the initiator 26.

Gas produced from combustion of the pyrotechnic gas generant 16 then propels the piston 20 into a flat portion 31 of a strap 30. The strap 30 is spooled and anchored at a first end 32 around a drive gear or geared pulley 34. A second end 36 of the strap 30 is preferably secured to the exterior of housing 18 at a point adjacent or proximate to the piston 20. Drive gear 34 engages a geared clutch sleeve 38 during normal operation of the vehicle. Once the pretensioner 10 is activate, the torque exerted by tensioned strap 30 rotates gear 34 and geared clutch sleeve 38 engaged thereto. A first end 42 of a webbing reel shaft 40 is axially disposed within a clutch assembly 37 and rotates independently of the clutch assembly 37 prior to pretensioner 10 activation. A second end 44 of retractor axle 40 extends through the housing 18 and into the retractor 14. A webbing spool or reel 46 in coaxial communication with the clutch assembly 37 rotates about the second end 44 for winding and unwinding of the seat belt 12.

A clutch 37 contains the geared clutch sleeve 38 compressively biased against a pair of fixed clutch segments 52 and 58, wherein a rotary torque exerted upon clutch sleeve 38 in turn exerts a compressive and rotary torque upon segments 52 and 58 as they grip the shaft 40 upon pretensioner activation 10. Although the Figures illustrate a preferred clutch, one of ordinary skill in the art will readily appreciate the possibility of employing other clutch designs in accordance with the present invention. Exemplary clutches are described in U.S. Pat. Nos. 5,451,008 and 5,743,480, herein incorporated by reference.

As shown in the Figures, a first shear pin 50 fixes the corresponding first clutch segment 52 to the housing 18 and to a cover 56. A second shear pin 54 fixes the corresponding second clutch segment 58 to the housing 18 and to the cover 56. The geared clutch segments 52 and 58 are fixed apart and radially outwardly of the retractor axle 40 wherein each segment is circumferentially opposed to the other relative to the circumference of the shaft 40. Stated another way, an inner surface 53 of arcuate segment 52 faces the inner surface 55 of arcuate segment 58 wherein the cylindrical shaft 40 lies therebetween. Conversely, clutch segments 52 and 58 are fixed radially inwardly of and in flush peripheral communication with an inner surface 39 of the geared clutch sleeve 38.

An axial cylinder or cylindrical portion 60 of pulley 34 accepts coiled or circumferential disposition of the strap 30 fixed thereto. Upon pretensioner activation and actuation of the piston 20, the tensioned strap 30 exerts a torque about the cylinder 60 of the pulley 34. As the torque increases responsive to linear movement of actuator 20, the geared pulley 34 exerts a rotary torque upon the geared clutch sleeve 38 in geared communication therewith. The geared clutch sleeve 38 in turn initially exerts a compressive torque upon segments 52 and 58. As the torque increases, the clutch sleeve 38 fractures respective shear pins 50 and 54, thereby simultaneously imparting a rotary and compressive torque to the segments and rotatably driving the clutch segments 52 and 58 about the shaft 40. As shaft 40 rotates, the webbing reel 46 correspondingly rotates and the seat belt 12 wound about the reel 46 is thereby pretensioned.

In yet another aspect of the invention, a first rectangular channel 72 has a first end 74 and a second end 76, and is formed longitudinally and substantially coextensive with the housing 18. The actuator 20 is housed within the first end 74 prior to ignition of the propellant 22 and pretensioner 10 activation. A spring 77 may be employed to bias a leading edge of the actuator 20 against the flat portion 31 of the strap 30 that crosses the passage 72. Noise due to vibration is thereby inhibited. The first end 32 of the strap 30 extends from portion 31 and is spooled about the cylindrical portion 60 of the pulley 34. The second end 36 of strap 30 is fixed to the exterior of the housing 18 adjacent the piston 20. When arranged in this manner, the strap 30 provides a motion multiplier effect comparable to that afforded by the use of geared motion multipliers such as planetary gears, but at a much lower cost. In sum, linear motion of the actuator 20 translates to rotary motions of the drive gear 34 and the geared clutch sleeve 38, and rotary motion of the spool 46 in co-axial relation with the geared clutch sleeve 38. The seat belt 12 is thus tightened.

In essence, the present invention incorporates several motion multiplying features: 1) the piston 20/strap 30 arrangement; 2) the two diameter geared pulley 34 (a smaller input diameter of cylinder 60 vs. a larger relative output diameter of geared portions meshed with sleeve 38, wherein the input diameter or cylinder 60 has the strap 30 coiled and fixed about it); and 3) larger drive gear 34 output diameter vs. a relatively smaller clutch sleeve 38 diameter. Additionally, the present invention simplifies the design and manufacturing of known motion multipliers incorporating clutch mechanisms. Finally, an essentially sealed housing 18 prevents the release of relatively large quantities of gas, noise, and flame.

To illustrate a retractor response based on pretensioner operation, see U.S. Pat. No. 5,899,399 to Brown et al., herein incorporated by reference. "Pretensioning" is generally defined to mean to take up slack in the seat belt. In accordance with the present invention, the gas produced by the gas generant propels the piston 20 into the strap 30 and thus affects rotary advancement of the hub 38 thereby tightening the slack in the seat belt 12.

Figure 8A:
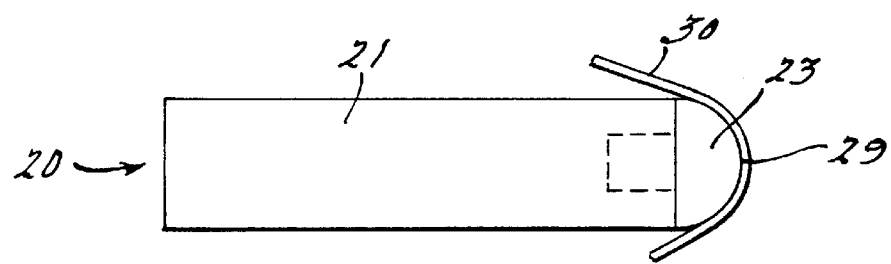
FIG. 8 is an elevational view of a preferred actuator.
Figure 8B:
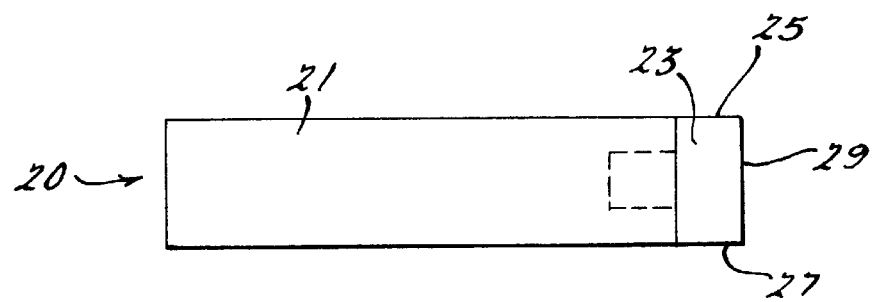
Figure 9:
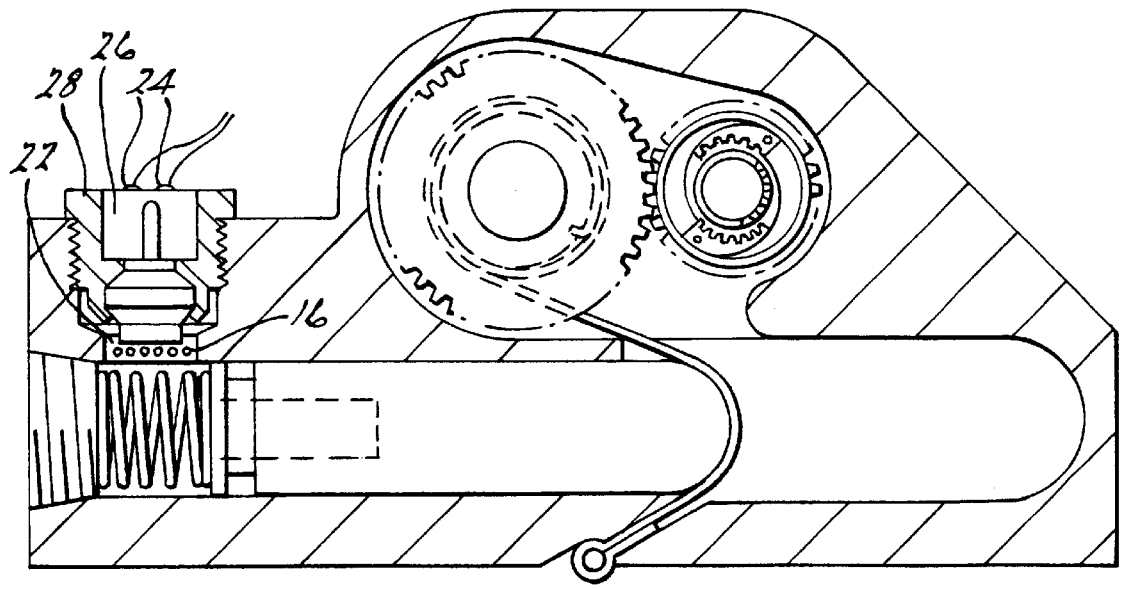
FIG. 9 is an elevational view of an embodiment containing a gas generator.

2. Finally, in yet another aspect of the invention, it has been found that the use of a preferred actuator as shown in FIG. 8 results in a substantial increase in strap integrity during pretensioner activation. Certain known actuators employ one-piece slugs having a rounded leading edge formed at one end of a cylindrical slug, bar stock for example. As this type of actuator 20 impels the strap 30, the strap 30 tends to deform about the rounded edge thereby weakening the strap at various points of deformation. This may lead to strap failure and pretensioner malfunction. On the other hand, an actuator 20 as shown in FIG. 8 includes a first cylindrical component 21 interlocked with a second component 23, the second component forming a leading or rounded edge 29 of the actuator 20 and having a first flat side 25 and a second flat side 27 wherein the sides are joined by the rounded edge 29, the rounded edge 29 in flush communication with the strap 30. It has been found that upon pretensioner 10 activation, the surface area of the leading edge 29 in contact with the strap 30 is increased, by virtue of the flat sides 25 and 27, thereby minimizing deformation and strap 30 failure.

The housing 18, the piston 20, the drive gear 34, the geared clutch sleeve 38, the clutch segments 52 and 58, and the initiator retainer 28 are preferably injection-molded, die cast, impacted, and/or machined from plastics, composites, and/or one or more metals such as steel, a steel alloy, zinc, or aluminum. The gas generating composition 16, the gas generator 22, the initiator 26 and the strap 30 are all manufactured or obtained by methods known to those of ordinary skill. Strap 30, for example, may be formed from steel or aluminum strip, steel or aluminum cable, or fabric (cloth or rubber) strip. Companies such as Takata, Inc. of Japan may supply the gas generator 22. The initiator 26 may be supplied by the original equipment manufacturer or from companies such as Special Devices Incorporated of Moorpark, Calif., for example. The aforementioned references are incorporated by reference and cited by way of example.

Resultant benefits include simplified manufacturing and retractor preservation. For example, see U.S. Pat. No. 5,899,399 to Brown et al. Also see U.S. Pat. No. 5,397,075 to Behr, herein incorporated by reference, wherein relatively complex gear driving mechanisms used to actuate the retractor axle can be replaced by the present invention. Finally, gas ventilation ports as described in the cited references are not required (but may be provided if desired) and therefore manufacturing is even further simplified.

While the foregoing illustrates and describes the use of the present invention, it is not intended to limit the invention as disclosed in certain preferred embodiments herein. Therefore, variations and modifications commensurate with the above teachings and the skill and/or knowledge of the relevant art, are within the scope of the present invention as described herein and as stated in the appended claims.

I claim:

1. A pretensioner cooperating with a webbing reel shaft axially extending from a seatbelt retractor webbing reel, that upon activation pretensions seatbelt webbing wound about the reel, the pretensioner comprising:

a housing containing a first rectangular passage longitudinally extending within said housing, the passage having a first end and a second end, and, the housing further containing a first end of the webbing reel shaft;

a first clutch segment and a second clutch segment fixed and spaced radially outwardly of said first end of said retractor shaft prior to pretensioner activation, each segment in circumferential opposition to the other segment wherein said shaft rotates independently of said segments prior to pretensioner activation and said segments grip said shaft upon pretensioner activation;

a geared clutch sleeve fixed radially outwardly of the segments, said sleeve having an inner surface in flush communication with the periphery of said first and second segments wherein said clutch sleeve exerts compressive and rotary torque upon the segments upon pretensioner activation;

a geared pulley in geared engagement with said clutch sleeve wherein said pulley exerts a rotary torque upon said clutch sleeve upon pretensioner activation;

a strap comprising a first end fixed to said housing, an intermediate portion extending from said first end and across said first passage, and a second end extending from said intermediate portion and spooled about and fixed to said pulley wherein said strap exerts a rotary torque upon said pulley upon pretensioner activation;

an actuator positioned within the first end of said passage for tensioning the strap upon pretensioner activation and thereby exerting a torque on the pulley;

a gas generant composition, ignitable to activate the pretensioner and release sufficient force to drive the actuator through said second passage; and an initiator contained within said housing and ignitably communicating with said gas generant composition for igniting said gas generant composition, whereby upon ignition of said gas generant and upon linear motion of said actuator, tensioning of the strap is thereby effected, resulting in rotary advancement of the pulley, the clutch sleeve, the segments, the webbing reel shaft, and the webbing reel, thereby winding the reel and tensioning the seatbelt webbing thereon.

2. The pretensioner of claim 1 wherein said actuator contains a gas generant composition that upon ignition propels the actuator.

3. The pretensioner of claim 1 further comprising a gas generator for containment of the gas generant composition wherein said gas generator fluidly communicates with said actuator upon pretensioner activation.

4. The pretensioner of claim 1 wherein said actuator comprises a first component and a second component interlocked with said first component, the second component forming a leading edge of the actuator and having a first flat side and a second flat side wherein the sides are joined by a rounded edge, the rounded edge oriented to be in flush communication with the strap during pretensioner activation.

5. A pretensioner cooperating with a webbing reel shaft axially extending from a seatbelt retractor webbing reel, that upon activation pretensions seatbelt webbing wound about the reel, the pretensioner comprising:

a housing containing a first rectangular passage longitudinally extending within said housing, the passage having a first end and a second end, and, the housing further containing a first end of the webbing reel shaft;

a first clutch segment and a second clutch segment fixed and spaced radially outwardly of said first end of said retractor shaft prior to pretensioner activation, each segment in circumferential opposition to the other segment wherein said shaft rotates independently of said segments prior to pretensioner activation and said segments grip said shaft upon pretensioner activation;

a geared clutch sleeve fixed radially outwardly of the segments, said sleeve having an inner surface in flush communication with the periphery of said first and second segments wherein said clutch sleeve exerts compressive and rotary torque upon the segments upon pretensioner activation;

a geared pulley in geared engagement with said clutch sleeve wherein said pulley exerts a rotary torque upon said clutch sleeve upon pretensioner activation;

a strap comprising a first end fixed to said housing, an intermediate portion extending from said first end and across said first passage, and a second end extending from said intermediate portion and spooled about and fixed to said pulley wherein said strap exerts a rotary torque upon said pulley upon pretensioner activation;

an actuator positioned within the first end of said passage for tensioning the strap upon pretensioner activation and thereby exerting a torque on the pulley; and a means for activating the pretensioner and driving the actuator through the passage thereby tensioning the strap, whereby upon activation of the pretensioner, the strap translates linear motion of the actuator to rotary movement of the pulley, the clutch sleeve, the clutch segments, and the spool in coaxial communication with the clutch sleeve, and thereby pretensions the seatbelt.

6. A pretensioner cooperating with a webbing reel shaft axially extending from a seatbelt retractor webbing reel, that upon activation pretensions seatbelt webbing wound about the reel, the pretensioner comprising:

a housing containing a first rectangular passage longitudinally extending within said housing, the passage having a first end and a second end, and, the housing further containing a first end of the webbing reel shaft;

a geared clutch spaced radially outwardly of said first end of the shaft for gripping the shaft upon pretensioner activation;

a geared pulley in geared engagement with said clutch wherein said pulley exerts a rotary torque upon said clutch upon pretensioner activation;

a strap comprising a first end fixed to said housing, an intermediate portion extending from said first end and across said first passage, and a second end extending from said intermediate portion and spooled about and fixed to said pulley wherein said strap exerts a rotary torque upon said pulley upon pretensioner activation;

an actuator positioned within the first end of said passage for tensioning the strap upon pretensioner activation and thereby exerting a torque on the pulley; and a means for activating the pretensioner and driving the actuator through the passage thereby tensioning the strap, whereby upon activation of the pretensioner, the strap translates linear motion of the actuator to rotary movement of the pulley, the clutch, and the spool in coaxial communication with the clutch, and thereby pretensions the seatbelt.

7. A pretensioner cooperating with a webbing reel shaft axially extending from a seatbelt retractor webbing reel, that upon activation pretensions seatbelt webbing wound about the reel, the pretensioner comprising:

a housing containing a first rectangular passage longitudinally extending within said housing, the passage having a first end and a second end, and, the housing further containing a first end of the webbing reel shaft;

a geared clutch spaced radially outwardly of said first end of the shaft for gripping the shaft upon pretensioner activation;

a geared pulley in geared engagement with said clutch wherein said pulley exerts a rotary torque upon said clutch upon pretensioner activation;

a strap comprising a first end fixed to said housing, an intermediate portion extending from said first end and across said first passage, and a second end extending from said intermediate portion and spooled about and fixed to said pulley wherein said strap exerts a rotary torque upon said pulley upon pretensioner activation;

an actuator positioned within the first end of said passage for tensioning the strap upon pretensioner activation and thereby exerting a torque on the pulley; and a gas generant composition, ignitable to activate the pretensioner and release sufficient force to drive the actuator through said second passage; and an initiator contained within said housing and ignitably communicating with said gas generant composition for igniting said gas generant composition, whereby upon ignition of said gas generant and upon linear motion of said actuator, tensioning of the strap is thereby effected, resulting in rotary advancement of the pulley, the clutch, the webbing reel shaft, and the webbing reel, thereby winding the reel and tensioning the seatbelt webbing thereon.

8. A pretensioner cooperating with a webbing reel shaft axially extending from a seatbelt retractor webbing reel, that upon activation pretensions seatbelt webbing wound about the reel, the pretensioner comprising:

a housing containing a first rectangular passage longitudinally extending within said housing, the passage having a first end and a second end, and, the housing further containing a first end of the webbing reel shaft;

a geared clutch means spaced radially outwardly of said first end of the shaft for gripping the shaft upon pretensioner activation;

a geared pulley in geared engagement with said clutch wherein said pulley exerts a rotary torque upon said clutch means upon pretensioner activation;

a strap comprising a first end fixed to said housing, an intermediate portion extending from said first end and across said first passage, and a second end extending from said intermediate portion and spooled about and fixed to said pulley wherein said strap exerts a rotary torque upon said pulley upon pretensioner activation;

an actuator positioned within the first end of said passage for tensioning the strap upon pretensioner activation and thereby exerting a torque on the pulley; and a means for activating the pretensioner and driving the actuator through the passage thereby tensioning the strap, whereby upon activation of the pretensioner, the strap translates linear motion of the actuator to rotary movement of the pulley, the clutch means, and the spool in coaxial communication with the clutch means, and thereby pretensions the seatbelt.

* * * * *